Feb. 25, 1930.    G. W. YANSS    1,748,096
AUTOMOBILE BUMPER
Filed July 21, 1926    2 Sheets-Sheet 1
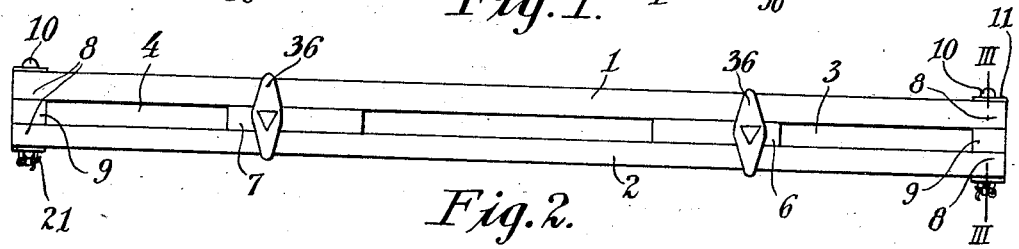
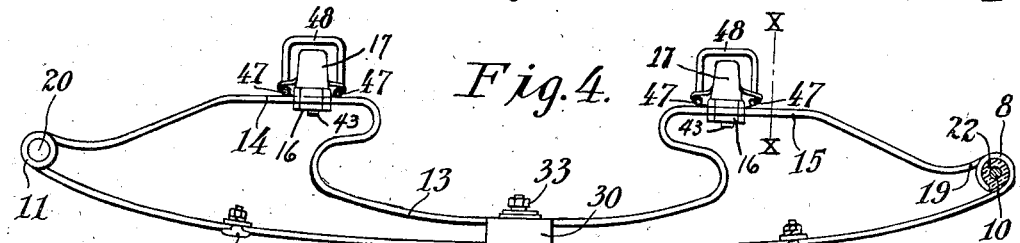
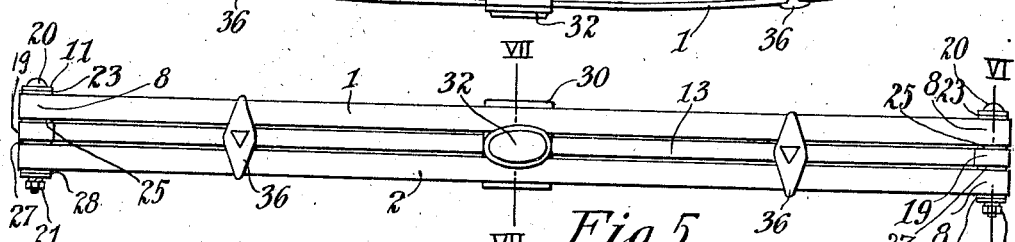
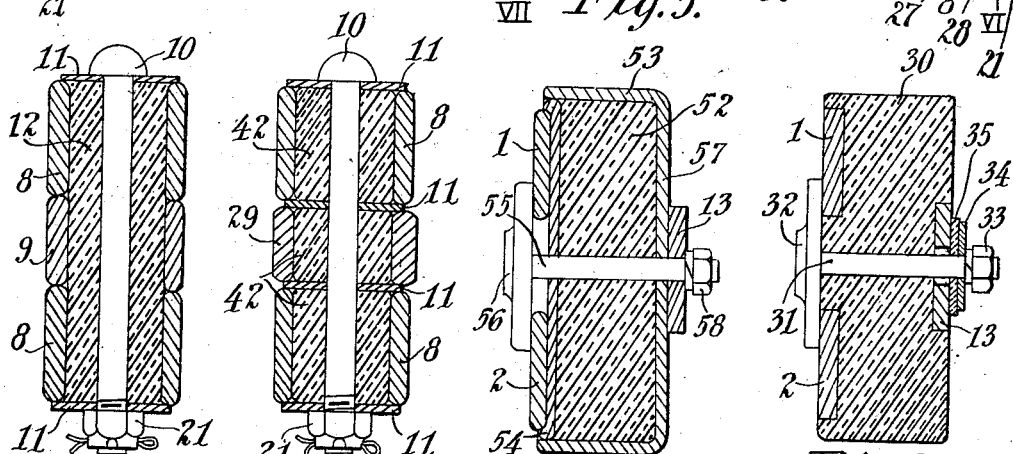
INVENTOR
George W. Yanss
BY
ATTORNEY Feb. 25, 1930.  G. W. YANSS  1,748,096
AUTOMOBILE BUMPER
Filed July 21, 1926   2 Sheets-Sheet 2

Inventor
George W. Yanss
By Frederick S. Duncan
Attorney

Patented Feb. 25, 1930

1,748,096

UNITED STATES PATENT OFFICE

GEORGE W. YANSS, OF BRIDGEPORT, CONNECTICUT, ASSIGNOR TO AMERICAN CHAIN COMPANY, INC., A CORPORATION OF NEW YORK

AUTOMOBILE BUMPER

Application filed July 21, 1926. Serial No. 123,871.

This invention relates to bumpers, and is of special utility when embodied in the construction of a bumper for automobiles and the like, although I contemplate the use of the improvements in any field for which they may be adapted by their nature.

An important object of the invention is to provide a bumper comprising resilient metal strips, and members adapted for attachment to a motor vehicle, with means to insulate the attaching members so that shocks received by the impact members of the bumper will not be communicated to the attaching members nor to the frame of the motor vehicle, such insulation serving also to avoid the communication to the bumper of vibrations incidental to the irregularities of the road upon which the vehicle is operated and such minor vibrations as arise from the operation of the engine.

The above and other objects of the invention are set forth and described in the accompanying drawings and specification and are pointed out in the claims.

In the drawings:

Figure 1 is a plan view of an automobile bumper in the construction of which my invention has been embodied, one of the ends thereof being shown in section.

Fig. 2 is a view in front elevation of the bumper shown in Fig. 1.

Fig. 3 is a fragmentary detail view in vertical section, upon an enlarged scale, taken upon the line III—III of Fig. 2.

Fig. 4 is a plan view similar to Fig. 1 of a modified form of bumper embodying the invention.

Fig. 5 is a view in front elevation of the bumper shown in Fig. 4.

Fig. 7 is a similar sectional view on the line VII—VII of Fig. 5.

Fig. 8 is a view similar to Fig. 3 of a modification.

Fig. 9 is a view similar to Fig. 7 of a modification.

Figure 6:
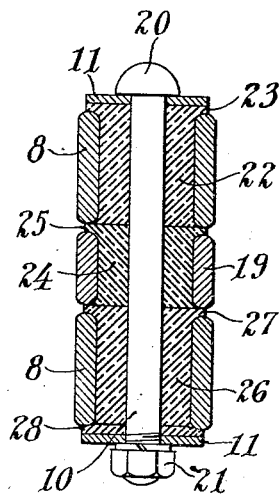
Fig. 6 is a fragmentary detail view in vertical section, upon an enlarged scale, taken on the line VI—VI of Fig. 5.
Figure 10:
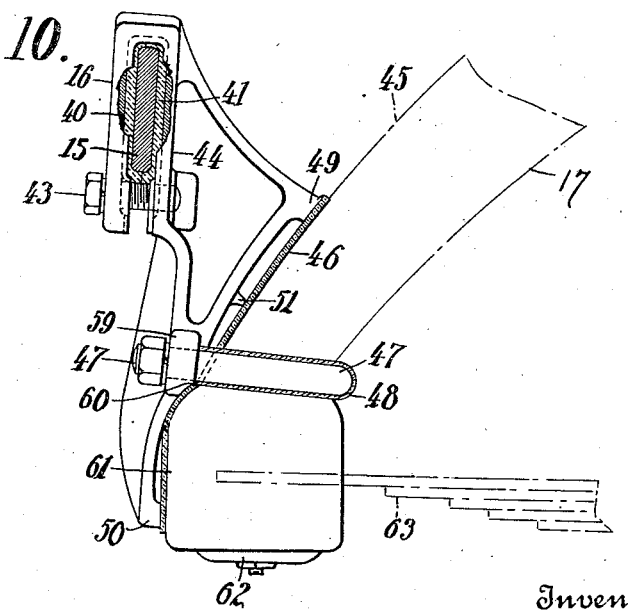
Fig. 10 is a view in vertical section on the line X—X of Fig. 4 looking from right to left, parts being broken away to show interior structure.

In the illustrated embodiment, referring to the form of bumper shown in Figs. 1, 2 and 3, the parts designated by the reference numerals 1 and 2 respectively are impact receiving members, preferably formed of flat, resilient steel strips arranged one above the other in the same vertical plane, and spaced vertically, preferably by means of suitable attaching members 3 and 4 which may be of any desired or suitable contour, preferably comprising similar strips of resilient steel adapted to be secured respectively at their portions 5 to the front or rear members of an automobile, and extended forward from such region of attachment toward the plane of the impact members, to which the respective ends 6 and 7 are secured in any suitable manner to carry out the purpose of the invention.

The now preferred form of connection at the end 6 is to form terminal eyes 8 upon the impact-receiving members and similar eyes 9 upon the attaching members respectively, and in the form of bumper illustrated in Figs. 1 and 2, the eye 9 at the end of each attaching member serves to space the eyes 8 of the impact-receiving members in vertical relation to each other, where they are connected by an upright bolt 10 acting preferably through the medium of washers 11 at the top and bottom.

In accordance with the invention, shock-insulating means are provided, which in the instance illustrated take the form of a bushing 12 of rubber surrounding the bolts, within the eyes respectively, as shown clearly in Fig. 3, so that when the eyes are placed under lateral stress tending to displace them relatively to each other, the shock or vibration is received by the rubber bushings 12 and are so diminished as to become unnoticeable, unless the shock is of such proportions as to bring into play the greater impact resisting properties of the bumper structure as a whole.

The above description refers to a relatively simple form of the device, and in Figs. 4 to 9 inclusive I have shown my further development of the invention, as applied to a bumper of modified construction in which a rear bar 13 is shown having portions 14 and 15 adapted to be attached by suitable clamps 16 to the ends 17 of the side members of a motor vehicle frame.

Inasmuch as the impact bars 1 and 2 of the bumper shown in Figs. 4 and 5 are substantially identical in structure with those illustrated in Figs. 1 and 2, the same reference numerals are used, including those applied to the terminal eyes.

The rear bar is preferably provided with eyes 19 like those described with reference to the part numbered 9 in Figs. 1 to 3, but it is to be noticed that the eyes 19 are turned in a direction reversely that of the eyes 8, and the bolts 10 may have somewhat larger heads 20, to compensate for the increased stress at the terminal ends, where such increase of size is found desirable.

In pursuance of the invention, I have shown the shock insulators 22 as modified somewhat for the purpose of completely avoiding any metallic contact between the eyes themselves and between the eyes and the bolt and its associated parts, this modified structure being shown clearly in Fig. 6.

The rubber bushing 22 shown as the preferred form of shock insulator in this modification is provided with a projection 23, in the form of a flange which is interposed between the washer 11 and eye 8 of the upper impact-receiving member and at 24 is shown a similar bushing having a flange 25 adapted to be interposed between the eye 19 and the eye 8 of the adjacent upper impact-receiving bar.

At 26 is shown another bushing having a flange 27 interposed between the eye 19 and the lower eye 8.

An auxiliary shock insulating disk 28 is shown surrounding the bolt between the washer 11 and the nut 21 at the lower end of the bolt.

By forming the shock insulator as a series of bushings the assembly of the same is rendered easy, and the operation of the shock insulating means effective for the purpose of avoiding all metallic contacts.

In furtherance of the same object, I prefer to provide shock insulating means at a point of connection between the rear bar 13 and intermediate portion of the impact-receiving bars 1 and 2, as shown in Figs. 4, 5 and 7. In the preferred form the shock insulating means at this region comprises a block 30 of rubber interposed between the impact bars 1 and 2 and the rear bar 13, the whole being held in assembled relation by a bolt 31 extending rearward from the face plate 32 which is adapted to engage the impact-receiving bars 1 and 2, the rear end of the bolt being extended through the rearward bar 13 and provided with a nut 33 engaged with a washer 34. A shock insulating disk 35 helps to prevent metallic contact between the washer 34 and the rear bar 13, so that there is no continuous metal contact from the impact-receiving members 1 and 2 and the rear bar 13, and thus the purpose of this feature of the invention is carried out, viz, to avoid any metallic avenue for the transmission of shocks or vibrations between parts of the bumper. Clamps 36 of a conventional character or of any suitable nature may be provided to aid in retaining the impact bars 1 and 2 in spaced relation.

Further provision for shock insulation may, and preferably is, provided at the region or regions of attachment of the bumper to the vehicle frame, and for this purpose rubber cushions 40 are illustrated as interposed between the attaching members 14 and 15 of the rear bar 13 and the brackets or clamps 16.

Sheet rubber may be used conveniently for this purpose, in one or more parts, preferably extending also behind the bar 15 as at 41, and held firmly under compression as by the clamping bolt 43 extending through an upright web 44 of the bracket; and the latter is preferably insulated from the horn 45 as by sheet rubber 46, being held firmly in place thereon, as by a U-bolt 47 covered with a rubber insulating sleeve 48. The bracket is shown as having feet 49 and 50 to localize the points of contact, for which purpose an additional projection 51 may also be provided, and ears 59 are preferably formed on the bracket to receive the legs of the bolt 47, these ears being adapted likewise to engage the sheet rubber and to afford lateral stability for the bracket. These ears in the instance illustrated are formed at each end of a transverse rib 60 which bears against a housing 61 at the end of the horn 45, the latter being of a well-known type which does not require description.

Accordingly, the bumper as a whole is provided with means to avoid transmission of shocks from the bumper to the frame of the motor vehicle, and also to avoid transmission of vibrations by metallic contacts at the attachment regions.

While it is desirable to carry out completely the above arrangements for shock insulation, it is to be understood that it is within the scope of my invention to provide for the shock insulation only at the parts where it is of primary importance, and in Figs. 8 and 9 I have shown respectively terminal connections between the impact receiving members and the attaching bar; also a mid-point connection; in which partial provision is made for shock absorption, such provision being of an effective character.

In the form illustrated, referring to Fig. 8, as already described, the reference characters 8 designate terminal eyes of the impact members similar to those illustrated and described with reference to Fig. 3, and 29 designates a co-operating terminal eye of an attachment member similar to the eye 9 in Fig. 3, but somewhat thicker, and shorter vertically to allow space for metal washers 11 which in this instance are interposed between the eyes 8 and the eye 29 as well as between the head of the bolt 10 and retaining nut 21 thereof. Such an arrangement may be found desirable for some installations, and it will be observed that the arrangement illustrated does not interfere with the lateral shock absorbing function of the blocks 42, of which there are three in this modified structure.

In Fig. 9, which illustrates a modification of the central connection between impact-receiving bars 1 and 2 and a rear bar 13, of a bumper which may be similar in general respects to that shown in Figs. 4 and 5. I have shown shock insulating means comprising a block of rubber 52 encased within a metal shell 53 having a face plate 54 extending vertically just behind the impact-receiving bars 1 and 2 near the middle of the bumper. The appliance is shown as held in assembled relation with the impact bars and the rear bar by means of a bolt 55 extending from a face plate 56 through the block 52 and the back part 57 of the shell 53 and also through the rear bar 13, the bolt being provided with a retaining nut 58 by which the members may be tightened, the plate 54 being preferably of suitable dimensions to permit the compression of the cushion 52 somewhat under the action of the nut 58, as illustrated in Fig. 9.

In the latter forms illustrated, the shock insulating members are so supported as to permit the use of relatively soft rubber or like elastic material.

Further modifications may be adopted to meet the exigencies of particular installations, the forms above illustrated and described having been selected by way of example to permit a ready and complete understanding of my improvements.

I claim:

1. A bumper adapted to be attached to a motor-vehicle, said bumper comprising metal impact-receiving and attaching members, and non-metallic insulating means adapted to prevent any metallic contacts between said members and between said attaching member and said motor vehicle.

2. A bumper adapted to be attached to a motor vehicle, said bumper comprising a plurality of metal members including impact-receiving members, attaching members and metal devices to secure said members together and to said vehicle, and non-metallic insulating means adapted to prevent metallic contacts throughout the several regions of union between said members and devices.

3. A bumper comprising an impact-receiving member formed with an eye, a connecting-bolt positioned within said eye, and shock-insulating means of non-metallic material between said eye and said bolt.

4. A bumper comprising an impact-receiving member formed with an eye, a connecting-bolt positioned within said eye, and shock-insulating means including a rubber bushing between said eye and said bolt.

5. A bumper comprising an impact-receiving member formed with an eye, an attaching member also formed with an eye, a bolt connecting said eyes, and non-metallic shock-insulating means between said bolt and eyes.

6. A bumper comprising an impact-receiving member formed with an eye, an attaching member also formed with an eye, a bolt connecting said eyes, and non-metallic shock-insulating means between said bolt and eyes and between adjacent portions of said eyes.

7. A bumper comprising an impact-receiving member formed with an eye, an attaching member also formed with an eye, a bolt connecting said eyes, and non-metallic shock-insulating means between said bolt and eyes and between adjacent portions of said eyes whereby said eyes are connected with each other without metallic contacts.

8. A bumper comprising a plurality of members each formed with an eye, said eyes being superimposed and connected by a bolt, and shock-insulating means of non-metallic material between said bolt and said eyes respectively, and adapted to withstand stresses and shocks due to relative movements of said eyes.

9. A bumper comprising a plurality of members each formed with an eye, said eyes being superimposed and connected by a bolt, and shock-insulating means of non-metallic material between said bolt and said eyes respectively, and adapted to withstand stresses and shocks due to relative movements of said eyes.

10. A bumper comprising a plurality of members each formed with an eye, a connecting-bolt transfixing said eyes, and a shock-insulator for each eye, certain of said shock-insulators having an integral flange extending between adjacent portions of said eyes.

11. A bumper comprising a plurality of members each formed with an eye, a connecting-bolt transfixing said eyes, and a shock-insulator for each eye, certain of said shock-insulators having respectively an integral flange extending between adjacent portions of said eyes, and a disk of shock-insulation interposed between one of said eyes and a retaining part of said bolt.

12. A bumper comprising a metal impact-receiving member, a metal attaching member, means to secure said attaching member to a vehicle, and shock-insulating means adapted to prevent any metallic contact between said bumper and said vehicle.

In testimony whereof, I have signed this specification.

GEORGE W. YANSS.